United States Patent
Orndorf et al.

(10) Patent No.: US 11,720,470 B2
(45) Date of Patent: Aug. 8, 2023

(54) DYNAMIC POST-CHANGE COMPUTING-SYSTEM EVALUATION

(71) Applicant: UnitedHealth Group Incorporated, Minnetonka, MN (US)

(72) Inventors: Ryan Orndorf, Tempe, AZ (US); Frederick Gass, Phoenix, AZ (US); Kenneth Washuta, Mound, MN (US)

(73) Assignee: UNITEDHEALTH GROUP INCORPORATED, Minnetonka, MN (US)

( * ) Notice: Subject to any disclaimer, the term of this patent is extended or adjusted under 35 U.S.C. 154(b) by 352 days.

(21) Appl. No.: 16/997,655

(22) Filed: Aug. 19, 2020

(65) Prior Publication Data

US 2022/0058103 A1 Feb. 24, 2022

(51) Int. Cl.
*G06F 11/34* (2006.01)
*G06F 11/36* (2006.01)

(52) U.S. Cl.
CPC ...... *G06F 11/3428* (2013.01); *G06F 11/3414* (2013.01); *G06F 11/3438* (2013.01); *G06F 11/3495* (2013.01); *G06F 11/366* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 6,681,389 B1* | 1/2004 | Engel | G06F 8/656 717/173 |
| 7,725,559 B2* | 5/2010 | Landis | G06F 9/5016 709/215 |
| 7,784,098 B1* | 8/2010 | Fan | G06F 11/1469 726/25 |
| 9,876,673 B2* | 1/2018 | Margalit | H04L 41/0672 |
| 10,095,598 B2* | 10/2018 | Harrison | H04L 41/147 |
| 10,142,204 B2* | 11/2018 | Nickolov | H04L 41/0869 |
| 10,270,668 B1* | 4/2019 | Thompson | H04L 41/16 |
| 11,023,442 B2* | 6/2021 | Pandya | G06F 16/2282 |
| 11,283,900 B2* | 3/2022 | Myers | H04L 67/34 |
| 11,321,155 B2* | 5/2022 | Bangad | G06F 9/5011 |
| 2013/0179144 A1* | 7/2013 | Lu | G06F 11/3433 703/20 |

(Continued)

*Primary Examiner* — Isaac Tuku Tecklu
(74) *Attorney, Agent, or Firm* — Shumaker & Sieffert, P.A.

(57) ABSTRACT

A performance-monitoring system is configured to determine whether a diminished performance of a computing system warrants prompt remedial action by generating a score indicative of various aspects of the computing system. In some examples, the performance-monitoring system identifies a change to a computing system comprising at least one server running two or more applications; runs one or more diagnostic tests on each of the two or more applications to collect additional performance data; determines, based on the additional performance data, a relative performance score for each of the two or more applications, wherein the relative performance score for a respective application indicates at least an effect of the change on an ability of a user to use the respective application to perform one or more user operations; determines that the performance score is less than a threshold score; and automatically reduces a rate of transaction requests sent to the server.

24 Claims, 4 Drawing Sheets

(56) References Cited

U.S. PATENT DOCUMENTS

| | | | |
|---|---|---|---|
| 2016/0315803 A1* | 10/2016 | Sadana | H04L 41/082 |
| 2020/0099773 A1* | 3/2020 | Myers | H04L 67/34 |
| 2020/0226003 A1* | 7/2020 | Margalit | G06F 16/2358 |
| 2022/0058103 A1* | 2/2022 | Orndorf | G06F 11/3438 |

\* cited by examiner

DYNAMIC POST-CHANGE COMPUTING-SYSTEM EVALUATION

TECHNICAL FIELD

This disclosure relates to computing systems.

BACKGROUND

A computing system device, computing system, or one or more applications running on such a device or system, may often require regular software updates. For example, a program, application, or operating system may download and install a software patch, such as to maintain and/or improve security or other functionality, to fix software bugs, or to satisfy changing user requirements. Occasionally, a software patch may itself contain one or more bugs, resulting in a diminished performance of the computing system, or in some occasions, a system failure.

SUMMARY

This disclosure describes techniques for managing and maintaining the performance of a computing system. As described herein, a computing system may be configured to self-identify a change in its functionality, such as a change or other effect resulting from a software update, and determine whether that change resulted in a reduced performance of the system. For example, upon identifying a change, the computing system may be configured to run diagnostics and determine a relative score indicating the performance and usability of the system. In some examples, the relative score may include one or more sub-scores, including at least one sub-score indicative of the effect of the diminished performance on the ability of a user to use or interact with the computing system. In some examples, if the relative score indicates a significantly reduced performance, such as compared to a baseline or threshold score, the computing system may be configured to perform one or more actions, such as throttling data transactions, automatically rolling back the most recent update, and/or restoring a corresponding application to a previous version.

In one aspect, this disclosure describes a method including identifying, by a first computing system, a change to a second computing system comprising at least one server running two or more applications; running, by the first computing system, one or more diagnostic tests on each of the two or more applications to collect additional performance data; determining, by the first computing system based on the additional performance data, a relative performance score for each of the two or more applications, wherein the relative performance score for a respective application indicates at least an effect of the change on an ability of a user to use the respective application to perform one or more user operations; determining, by the first computing system, that the performance score is less than a threshold score; and automatically reducing, by the first computing system, a rate of transaction requests sent to the server in response to determining that the performance score is less than the threshold score.

In another aspect, this disclosure describes a first computing system first computing system including: a memory configured to store performance data; and one or more processors configured to: identify a change to a second computing system; run one or more diagnostic tests on the second computing system to collect the performance data; determine, based on the additional performance data, a relative performance score for the second computing system, wherein the relative performance score indicates at least an effect of the change on one or more user operations of the second computing system; determine that the performance score is less than a threshold score; and automatically reduce a rate of transaction requests sent to a server or an application of the second computing system in response to determining that the performance score is less than the threshold score.

In another aspect, this disclosure describes a non-transitory computer-readable storage medium having instructions stored thereon that, when executed, configure a first computing system to: identify a change to a second computing system; run one or more diagnostic tests on the second computing system to collect additional performance data; determine, based on the additional performance data, a relative performance score for the second computing system, wherein the relative performance score indicatives at least an effect of the change on one or more user operations; determine that the performance score is less than a threshold score; and automatically reduce a rate of transaction requests sent to a server or application of the second computing system in response to determining that the performance score is less than the threshold score.

In another aspect, this disclosure describes a computing system including means for identifying a change to a second computing system; means for running one or more diagnostic tests on the second computing system to collect additional performance data; means for determining, based on the additional performance data, a relative performance score for the second computing system, wherein the relative performance score indicates at least an effect of the change on one or more user operations; means for determining that the performance score is less than a threshold score; and means for automatically reducing a rate of transaction requests sent to a server or application of the second computing system in response to determining that the performance score is less than the threshold score.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

A computing system, computing device, or one or more applications running on such a system or device, may often require regular software updates. For example, a program, application, or operating system may download and install a software patch, such as to maintain and/or improve security or other functionality, to fix software bugs, or to satisfy changing user requirements. Occasionally, a software patch may itself contain one or more bugs, resulting in a diminished performance of the computing system, or in some occasions, a system failure.

While a human-based support team, such as Information Technology (IT) personnel may be adept at handling dynamic system-performance issues, the potential for human error may be introduced. For example, different support team personnel may have inconsistent system-evaluation procedures, or may not share a common foundation of diagnostic and repair knowledge. For example, the diagnosis and repair procedures of individual human specialists may often be incorrect, inconsistent, or measured against different standards of quality or completeness, and accordingly may not fully address the problem or in some cases, may even exacerbate the poor performance. Further, a human may be unable to quantitatively evaluate a change in computing performance, such as a reduced response time of an application.

In accordance with one or more techniques of this disclosure, a computing system including at least one computing device (e.g., terminal, server, etc.) includes a dynamic, post-change evaluation system configured to identify a change to a computing system (e.g. to the same computing system or to a second, distinct computing system), such as an update to the operating system or an application (e.g., software), or the installation of a new application. Upon identifying such a change, the evaluation system may evaluate the change to determine whether the change resulted in a reduced performance of the computing system. In particular, the evaluation system may determine whether the change has significantly affected the immediate or near-term usability of the computing system, such that prompt remedial action is warranted. In such cases, the computing system may be configured to perform one or more remedial actions, such as throttling data transactions, automatically rolling back the most recent update, and/or restoring a corresponding application to a previous version.

Figure 1:
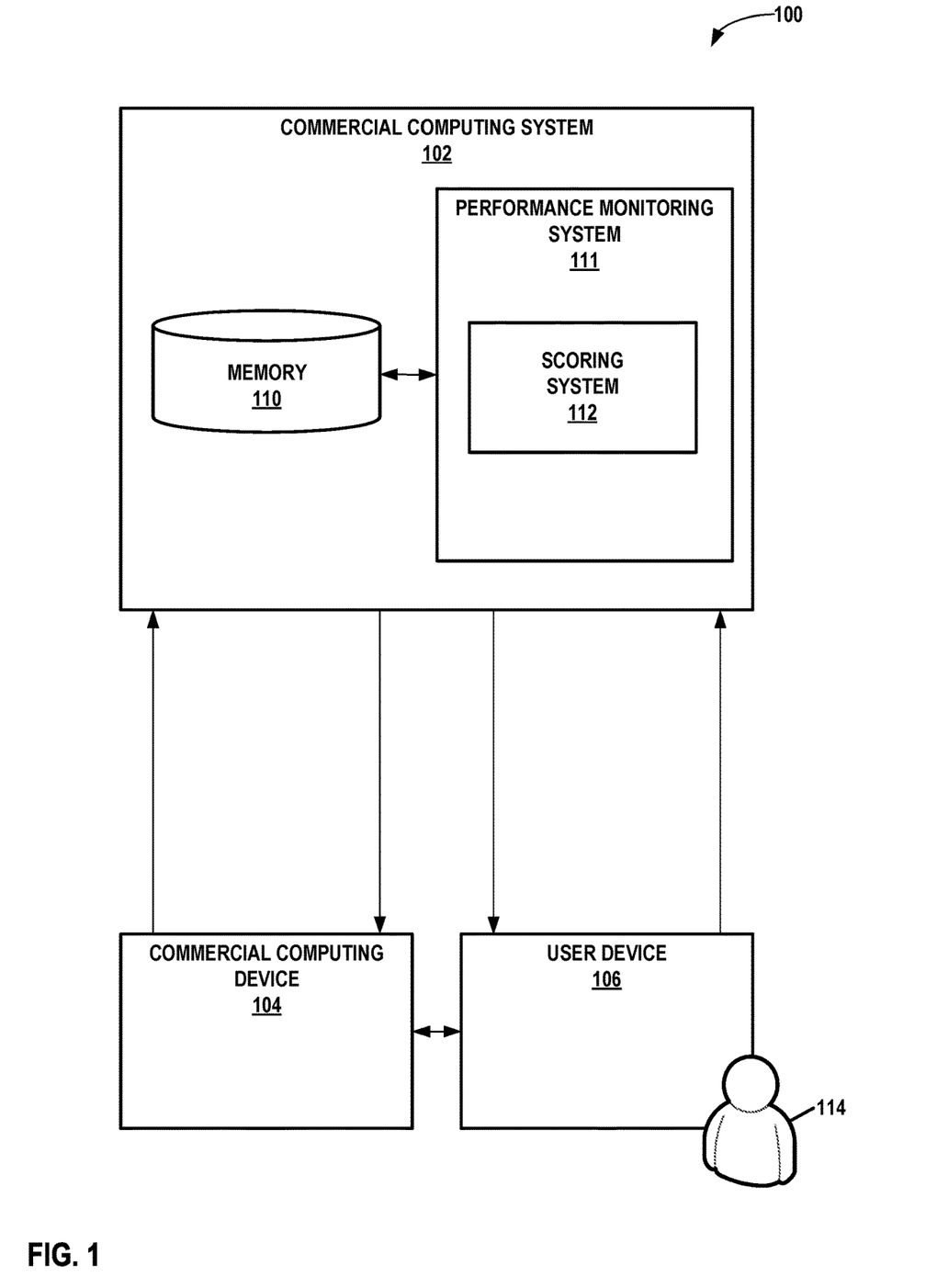
FIG. 1 is a block diagram illustrating an example computing system in accordance with one or more aspects of this disclosure.

FIG. 1 is a block diagram illustrating an example system 100 in accordance with one or more aspects of this disclosure. In the example of FIG. 1, system 100 includes a computing system 102, a computing device 104, and a user device 106. In other examples, system 100 may include more, fewer, or different components. For instance, in some examples, computing device 104 may be incorporated directly within computing system 102. In some examples, system 100 may not include user device 106, or alternatively, system 100 may include additional computing devices 104 and user devices 106.

Computing system 102 may include one or more computing devices. In examples where computing system 102 includes two or more computing devices, the computing devices of computing system 102 may act together as a system. Example types of computing devices include server devices, personal computers, handheld computers, intermediate network devices, data storage devices, and so on. In examples where computing system 102 includes two or more networked computing devices, the computing devices of computing system 102 may be geographically distributed or concentrated together, e.g., in a single data center.

In some examples, computing device 104 may include one of the individual computing devices of computing system 102. In some examples, computing system 102 may include a set of back-end computing devices, such as servers housed within a datacenter, and computing device 104 may include one or more front-end computing devices, such as user terminals or point-of-sale (POS) devices. Computing device 104 may communicate (e.g., exchange data) with the larger network of computing devices or servers 102 owned and operated by the business in order to further enable one or more operations.

In some examples, a user may use user device 106 to conduct one or more operations with computing system 102. User device 106 may include a computing device, such as a mobile telephone, tablet, personal computer, wearable device, or other type of computing device. For example, a first user 114 may use a personal computing device 106 to purchase goods or services from a business, such as by communicating directly with commercial computing system 102 via the internet. In some examples, a first user 114 of computing system 102 may use user device 106 to interact with a second user of computing system 102 by contacting the second user's computing device 104, such as via email or other similar data communication methods.

Computing system 102, computing device 104, and user device 106 may communicate via one or more communication networks. For instance, in some examples, computing system 102, computing device 104, and user device 106 may communicate via a wide area network, such as the Internet. The communication networks may include one or more wireless or wire-based communication links.

A computing system device or computing system, such as any or all of commercial computing system 102, commercial computing device 104, and/or user device 106, may often require regular software updates. In some examples in accordance with this disclosure, computing system 102 includes a performance monitoring system 111 configured to monitor, assess, and manage a relative performance of computing system 102, particularly with regard to the ability of computing system 102 to enable direct interactions with users and/or complete short-term computing operational goals. As one non-limiting example of this concept, performance monitoring system may generate a relative performance score configured to evaluate the ability of computing system 102 to conduct and/or facilitate business transactions or operations with or on behalf of users, such as employees or customers of a commercial enterprise.

For example, performance monitoring system 111 may be configured to identify a change to computing system 102, such as a software or firmware update, a newly installed program or application, a reallocation or partitioning of memory, an addition or removal of a computing device from the network, or other similar change in functionality of commercial computing system 102. In some examples, but not all examples, performance monitoring system 111 may be configured to initially determine whether the identified change has caused, resulted in, or is otherwise correlated to or responsible for a reduced performance of one or more aspects of computing system 102. For example, a reduced performance may include slower transaction times, failed data requests, partially or fully disabled applications, or other similar reductions in the functionality of computing system 102. Performance monitoring system 111 may be configured to compare a current performance (such as data transaction times) to a previous performance stored in memory 110, in order to determine whether the current performance has been reduced (e.g., data transaction times are longer than they were previously).

Upon identifying such a change, performance monitoring system 111 may be configured to run one or more diagnostic tests on the computing system to collect additional performance data in order to further assess or evaluate the relative performance of computing system 102. For example, performance monitoring system 111 may be configured to generate or retrieve an error log or an event log from an operating system of computing system 102. Performance monitoring system 111 may use the collected performance data to identify a specific cause of the reduced performance, such as a particular update, installed application, virus, or other specific cause. For example, performance monitoring system 111 may determine a timeframe within which the diminished or reduced performance began, and then identify, from the collected performance data, one or more system changes that also occurred within that timeframe.

In some examples, performance monitoring system 111 may include a scoring system 112 configured to determine, based on the collected performance data, a relative performance score in order to objectively evaluate the current performance of the computing system. For example, the relative performance score may be configured to indicate at least a relative degree of severity of the reduced performance of the overall computing system. In some examples, the relative performance score may be composed of (e.g., equal to a sum of) one or more sub-scores, wherein each sub-score indicates a distinct aspect of the performance of computing system 102.

For example, the performance score may include a "usability" sub-score, configured to assess the effects of a reduced computing performance on one or more immediate, short-term, or direct computing operations. For example, the usability sub-score may evaluate the front-end performance of computing system 102, such as the functionality of a user interface on computing device 104 or user device 106, or other direct interactions with user 114. Alternatively or additionally, the usability sub-score may evaluate the back-end performance of computing system 102, such as the ability of computing system 102 to process data on behalf of user requests and/or transactions. Alternatively or additionally, by incorporating data indicative of project deadlines, the usability sub-score may evaluate the ability of computing system 102 to meet or fulfil one or more contractual obligations of the user within a pre-determined timeframe or by a predetermined date. As one non-limiting example, the usability sub-score may indicate the degree to which computing system 102 may complete time-sensitive data processing during an estimated or average time required for a "typical" IT issue to be resolved. In other words, the usability sub-score may indicate whether or to what degree a reduced performance of computing system 102 constitutes a threat to a user in terms of both the severity and immediacy of probable consequences, such that prompt (e.g., drastic) remedial action is warranted.

In some examples, the performance score may include a "technology" sub-score, configured to assess, evaluate, or otherwise indicate the status of one or more technological aspects of computing system 102. For example, the technology sub-score may indicate a number or percentage of inactive servers, a number or percentage of inactive applications, a response time of an application relative to a threshold or baseline range, or whether an outage of the computing system is scheduled or unscheduled.

In some examples, the performance score may include an "operational impact" sub-score, indicative of an overall operability or functionality of computing system 102 or an application of computing system 102. For example, the operational impact sub-score may indicate a number and/or type of affected servers and/or affected applications within computing system 102.

In some examples, in response to determining the sub-scores and computing the combined performance score, performance monitoring system 111 may be configured to compare the current performance score (or in some examples, a change in the performance score) to a threshold or baseline performance score (or score change). In response to determining that the current performance score is less than a threshold score, performance monitoring system 111 may be configured to automatically perform any of a number of actions to address any identified performance issues. For example, performance monitoring system 111 may be configured to automatically restore computing system 102 to a previous version of the computing system 102, such as a version prior to a most-recent update. Alternatively or additionally, in response to determining that the overall score is below the threshold, monitoring system 111 may automatically throttle a rate of transactions or requests sent to a specific server or application within computing system 102. For example, a transaction could be throttled by reducing the number of transactions in a data stream transmitted to a pool of servers of computing system 102. As one illustrative example, a server pool may include five servers, each server processing around 500 transactions per minute. If a particular server is becoming overloaded, performance monitoring system 111 may reduce the transactions to 250 transactions per minute for the affected server. Performance monitoring system 111 may enact this change at either the server level or the application level. Some example techniques for throttling data transactions include reducing the way log transactions are recorded and written.

In some examples, in response to determining that the overall score is below the threshold, monitoring system 111 may automatically alert IT support staff to further diagnose and/or address problems within computing system 102.

In some examples, performance monitoring system 111 may be configured to store a set of data within memory 110, such as the additional collected performance data, the relative performance score, an indication of any remedial actions performed, and an indication of the effectiveness of the remedial actions. Accordingly, prior to any future scheduled updates, performance monitoring system 111 may consult the stored data to determine whether the future update is likely to cause any similar performance issues as a previous update had caused, and if so, any effective solutions to avoid or repair similar performance issues. Additionally or alternatively, subsequent to identifying a future reduced system performance, performance monitoring system 111 may consult the stored data to determine whether a particular remedial action has successfully resolved similar performance issues in the past.

Figure 2:
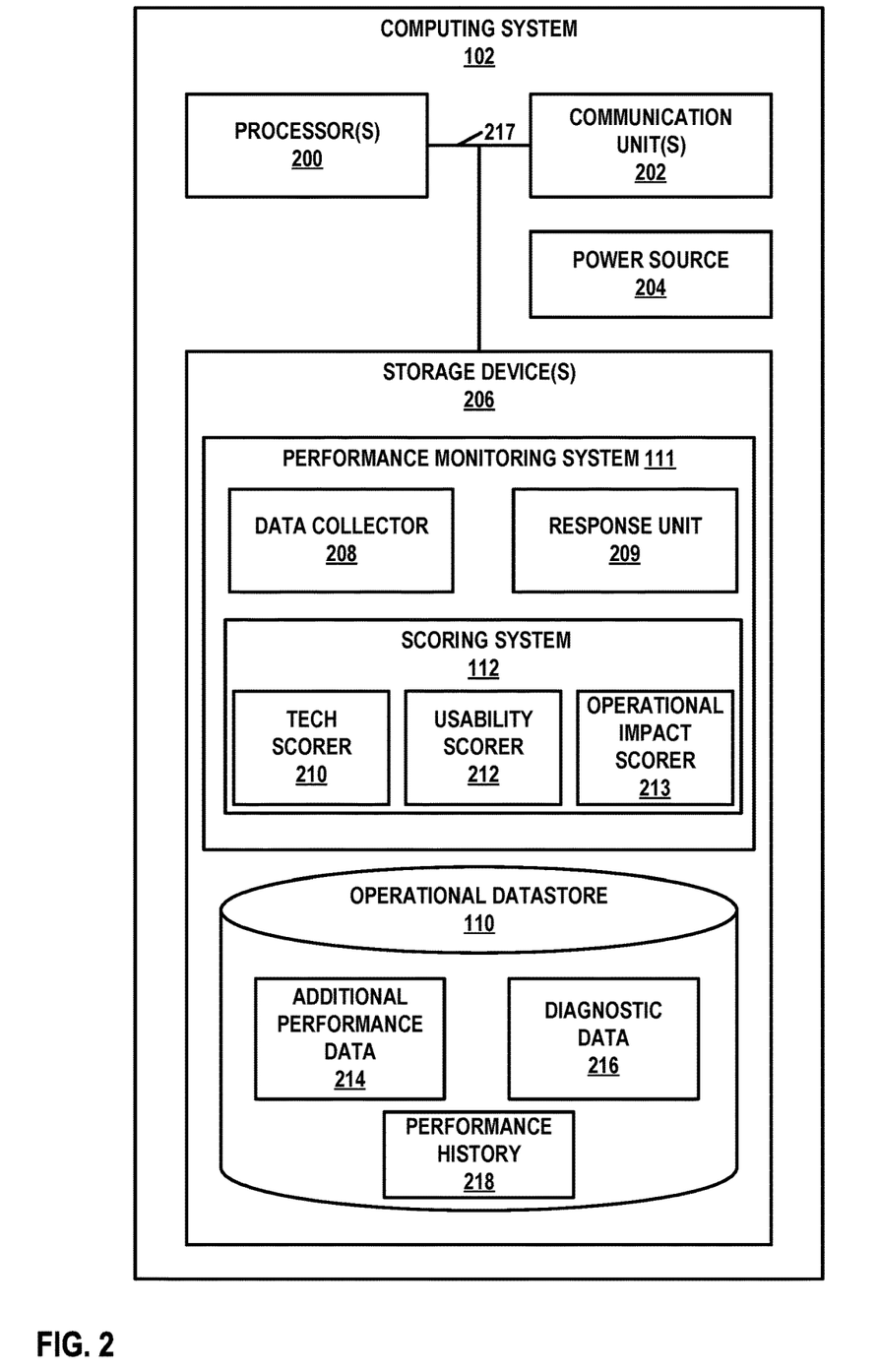
FIG. 2 is a block diagram illustrating example components of a computing system in accordance with one or more aspects of this disclosure.

FIG. 2 is a block diagram illustrating some example components of computing system 102 of FIG. 1, in accordance with one or more aspects of this disclosure. FIG. 2 illustrates only one particular example of computing system 102, without limitation on many other example configurations of computing system 102.

As shown in the example of FIG. 2, computing system 102 includes one or more processor(s) 200, one or more communication unit(s) 202, a power source 204, one or more storage device(s) 206, and one or more communication channels 217. Computing system 102 may include other components. For example, computing system 102 may include input devices, output devices, display screens, and so on. Communication channel(s) 217 may interconnect each of components 200, 202, and 206 for inter-component communications (physically, communicatively, and/or operatively). In some examples, communication channel(s) 217 may include a system bus, a network connection, an inter-process communication data structure, or any other method for communicating data. Power source 204 may provide electrical energy to components 200, 202, and 206.

Storage device(s) 206 may store information required for use during operation of computing system 102.

Processor(s) 200 comprises circuitry configured to perform processing functions. For instance, one or more of processor(s) 200 may be a microprocessor, application-specific integrated circuit (ASIC), field-programmable gate array (FPGA), or other type of processing circuit. In some examples, processor(s) 200 of computing system 102 read and may execute instructions stored by storage device(s) 206.

Communication unit(s) 202 may enable computing system 102 to send data to and receive data from one or more other computing devices (e.g., via a communications network, such as a local area network or the Internet). In some examples, communication unit(s) 202 may include wireless transmitters and receivers that enable computing system 102 to communicate wirelessly with the other computing devices. Examples of communication unit(s) 202 may include network interface cards, Ethernet cards, optical transceivers, radio frequency transceivers, or other types of devices that are able to send and receive information. Other examples of such communication units may include BLUETOOTH™, 3G, 4G, 5G, and WI-FITM radios, Universal Serial Bus (USB) interfaces, etc. Computing system 102 may use communication unit(s) 202 to communicate with one or more other computing devices or systems, such as computing device 104 (FIG. 1) and user device 106.

Storage device(s) 206 may store operational datastore 110. In the example of FIG. 2, operational datastore 110 may include additional performance data 214, diagnostic data 216, and performance history logs 218. Processor(s) 200 may read instructions from storage device(s) 206 and may execute instructions stored by storage device(s) 206. Execution of the instructions by processor(s) 200 may configure or cause computing system 102 to provide at least some of the functionality ascribed in this disclosure to computing system 102.

As shown in the example of FIG. 2, storage device(s) 206 include computer-readable instructions associated with performance monitoring system 111. Furthermore, in the example of FIG. 2, the computer-readable instructions associated with performance monitoring system 111 may include computer-readable instructions associated with data collector 208 and a response unit 209. Additionally, in the example of FIG. 2, storage device(s) 206 may include computer-readable instructions associated with scoring system 112. The computer-readable instructions associated with scoring system 112 may include computer-readable instructions associated with a technology scorer 210, usability scorer 212, and operational-impact scorer 213.

In some examples in accordance with this disclosure, performance monitoring system 111 is configured to monitor computing system 102 to identify either a change to computing system 102, such as an update to the operating system or applications; an outage of computing system 102, such as an unresponsive server or application; or both. In such cases, data collector 208 is configured to collect additional system data in order to diagnose or determine a cause of the identified change or outage. For example, data collector 208 may collect a system error log or system event viewer.

In some examples, but not all examples, data collector 208 may then filter out all recorded system changes except those designated as "major" or "severe." For example, data collector 208 may filter out software downloads and installations designated as "successful" or "error-free," as well as warning messages on event logs (e.g., a "warning" message may not indicate an actual error or failure, and in some such examples may be disregarded). Data collector 208 may further collect all information messages on logs, and all messages associated with the "Error, "Major," "Severe" change types. If performance monitoring system 111 identifies a server-type change, data collector 208 collects system log files for the CPU, Memory, Disk, and Network utilization, as well as all information messages on these logs.

In some examples, data collector 208 may collect specific types of event data from the event logs such as dates (e.g., the date the event occurred), times (e.g., the time the event occurred), any user who has logged onto the computer when the event occurred, an event ID (e.g., an event number that identifies the event type), a source that generated the event (e.g., an application or system component), a type of event (e.g., "Information," "Warning," "Error," "Success Audit," and/or "Failure Audit"). Data collector 208 may store any or all of this collected data within operational datastore 110 for record keeping.

Performance monitoring system 111 is configured to monitor computing system 102 for an outage, such as an unresponsive server or application. If such a change is detected, data collector 208 may compare the host (e.g., the downed server) to an outage scheduler to determine if the outage was planned or unplanned. If data collector 208 finds a corresponding record on the outage scheduler, performance monitoring system 111 may take no further action until the scheduled outage window has expired. Conversely, if the identified outage is considered unscheduled (e.g., does not appear in the outage scheduler), response unit 209 may trigger an alert while data collector 208 retrieves additional diagnostic data. For example, data collector 208 may ping the host and collect response details (e.g., response time) in order to determine the server availability and/or service availability (e.g., of an identified application experiencing an outage). If the identified application is responsive, data collector 208 may execute synthetic transactions to further diagnose performance issues with the application. For example, a "synthetic transaction" to a server may include a "ping" to a server with a corresponding successful reply back. In other examples, a synthetic transaction to an application may include duplicating a previous data transaction that resulted in a failure (e.g., as indicated by user input or feedback). Data collector 208 may compare the functionality of the affected host to related server types in order to identify (or narrow down) a potential cause of the performance issues.

Using any or all of the data collected by data collector 208, scoring system 112 is configured to generate a relative performance score for computing system 102 in order to guide and inform any further remedial action. In particular, in accordance with the techniques of this disclosure, it is recognized that certain types of responsive remedial actions, such as throttling data requests, rolling back a recent update, taking one or more servers offline, or the like, may be (at least temporarily) just as disruptive to one or more user operations as the offending performance issue itself. Accordingly, the relative performance score includes at least a "usability" sub-score, indicative of the direct effects of any existing performance issues on the ability of a user to user or interact with computing system 102. For example, the inclusion of the usability sub-score enables performance monitoring system 111 to make an informed decision as to whether an immediate remedial response to an identified computing-performance issue would be more harmful to the user's productivity than the performance issue itself.

As one non-limiting, illustrative example, consider a server running two applications. A first application is experiencing significant performance issues that may require taking the entire server offline to repair. However, the second application, which is not currently experiencing performance issues, is directly vital to the user operations conducted on the server, while the first application is not so directly vital. This scenario would likely result in a relatively high usability sub-score, informing performance monitoring system 111 that taking the server offline for repairs during typical usage hours would not be warranted.

More specifically, in some examples, the usability sub-score may indicate a relative severity of the effect of the change on one or more external-facing (e.g., user-interface-based) operations of the computing system; a relative severity of the effect of the change on internal-facing operations of the computing system; a relative severity of the effect of the change on an ability to complete computational contractual obligations of the computing system; or a relative recovery opportunity indicative of an amount of time available to improve the performance before the one or more users are substantially affected (e.g., an immediacy and/or severity of the consequences of the reduced performance to the user). As another non-limiting, illustrative example, certain contractual obligations may typically have completion deadlines at the end of each calendar month. Usability scorer 212 may determine, based on the date of the identified performance issue, that there are still three weeks before certain contractual obligations become due. Such scenarios would likely result in a relatively higher usability sub-score than if the performance issue were identified on the $29^{th}$ of the current month.

Similarly, technology scorer 210 generates a "technology" sub-score. The technology sub-score may indicate, for example, a number of inactive servers; a number of inactive applications; a response time of an application relative to a threshold range; or whether an outage of the computing system is scheduled or unscheduled. Similarly, operational-impact scorer 213 generates an "operational impact" sub-score. The operational impact sub-score may indicate, for example, the overall relative operability or functionality of the computing system or an application of the computing system.

A non-limiting example of some possible metrics for the relative performance score is as follows:
Technology Sub-Score:
  Server Up/Down (Accessibility)
    Server up=8
    Server down=1
  Application Response Time
    Within Raw Error Rate=8
    Out-of-bounds by 50%=5
    Out-of-bounds by 90%=1
  Outage Type
    Scheduled Outage=7
    Unscheduled Outage=2
    Type of Effect=5
    Type of server=5
Usability Sub-Score:
  Front-End Effect on Users=3
  Back-End Effect on Processing=7
  Disrupted Contractual Obligations=1
  Recovery Opportunity=9
Operational Impact Sub-Score:
  Server Type=6
  Application Type=4
  Help desk ticket analysis=5
As indicated above, performance monitoring system 111 calculates each sub-score from a number of contributing factors or elements. Performance monitoring system 111 may be configured to output the individual sub-scores to a user interface enabling IT personnel to make "at-a-glance" judgments on the statistical metrics that contributed to the relative performance score. In some such examples, a combination of the usability and technology sub-scores may be used to identify the "recovery opportunity" indicating how soon the identified performance issue must be resolved before user operations are substantially hindered. For example, the technology sub-score may indicate the server type, such as a virtual machine (VM) or a physical server, or for example, whether the server is load-balanced or is considered a single point of failure. For example, a virtual machine may be easier to reboot or repair than a physical server, and accordingly, may correspond to a relatively higher server-type sub-score. As another example, the usability sub-score may assign a relatively higher value (e.g., corresponding to a lower numerical sub-score) on front-end effects to users of computing system 102 than to effects on back-end data processing. The "Help desk ticket analysis" factor may be defined as more than 50% of users opening up an IT ticket request within 15 minutes of the problem occurring.

A non-limiting example of a calculation of the relative performance score is as follows:
Ideal Score
  Technology=9 (9*9=81)
  Usability=10 (10*10=100)
  Operational Impact=8 (8*8=64)
  Ideal Score=100+81+64=245
  Ideal Percentage=(245/245)*100 =100%
Threshold Score
  Technology=5 (5*9=45)
  Usability=6 (6*10=60)
  Operational Impact=7 (7*8=56)
  Threshold Score=45+60+56=161
  Threshold Percentage=(161/245)*100=6%
Current Performance Score
  Technology=9 (9*9=81)
  Usability=9 (9*10=90)
  Operational Impact=9 (9*8=72)
  Current Performance Score=81+90+72=243
  Current Performance Percentage=(243/245)*100=99%

As indicated in this example, scores may be normalized from 1 to 100, corresponding to precise percentage vales. In this example, the current relative performance score of 99% exceeds the "threshold" performance score of 65%, and accordingly, performance monitoring system will not take any immediate remedial action. However, in other examples in which scoring system 112 determines that the combined performance score is below the threshold score of 65% (or any other predetermined minimum threshold score), performance monitoring system 111 may take immediate remedial actions, such as throttling transactions and/or attempting a system recovery using the collected data from log files and synthetic transactions.

Throughout this process, performance monitoring system 111 may store collected performance data, data indicative of remedial actions taken, and/or data indicative of the results of the remedial actions, within operational data store 110. Accordingly, during subsequent reduced performance analyses, performance monitoring system 111 may consult the stored data to determine whether a previously attempted solution is likely to resolve a similar performance issue.

Figure 3:
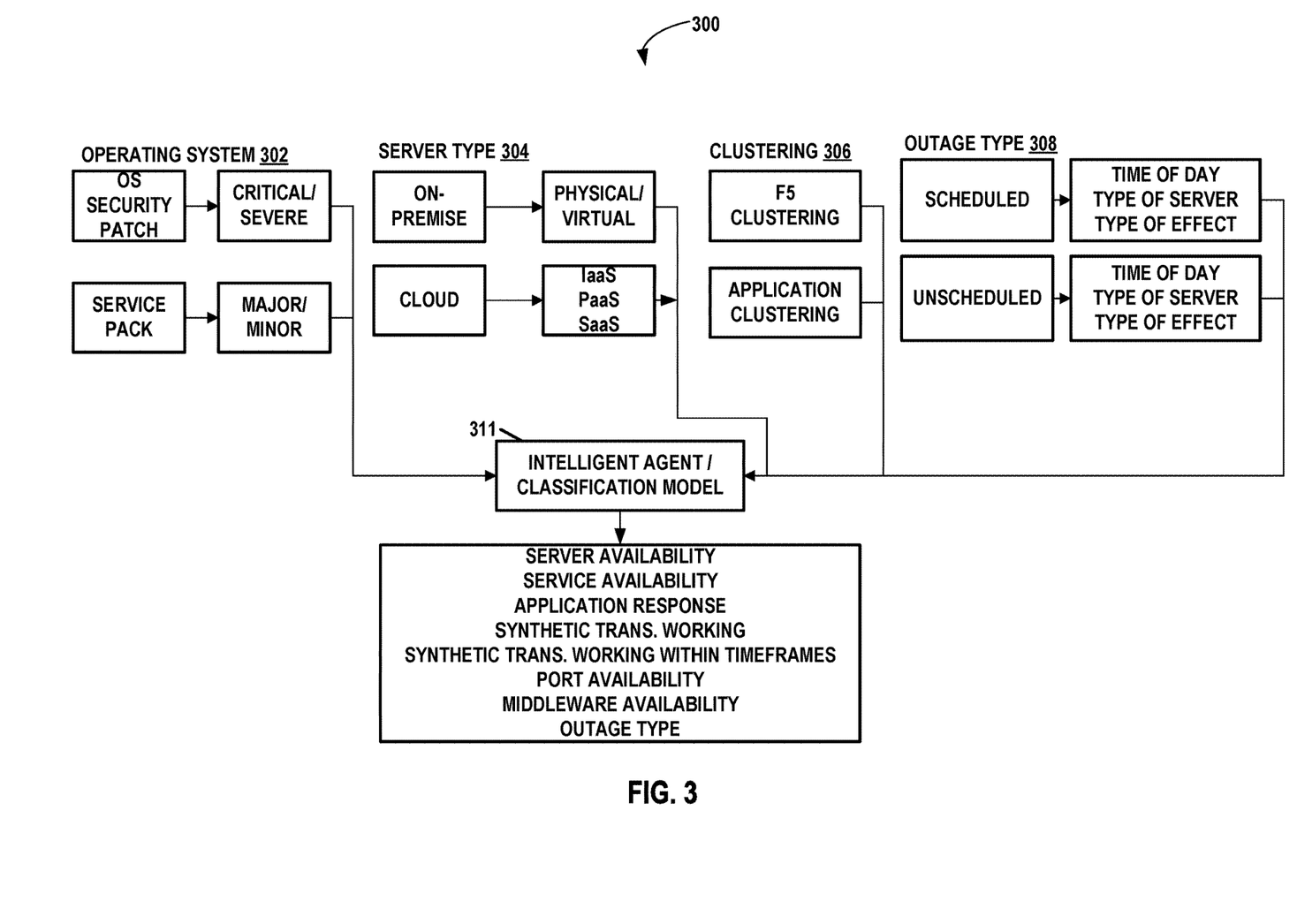
FIG. 3 is a conceptual diagram depicting a system for managing the performance of a computing system, in accordance with one or more aspects of this disclosure.

FIG. 3 is a conceptual diagram depicting a system 300 for managing the performance of a computing system, in accordance with one or more aspects of this disclosure. System 300 includes an intelligent agent 311, which may be an example of performance monitoring system 111 of FIGS. 1 and 2.

Intelligent agent 311 (e.g., data collector 208 of performance monitoring system 111 of FIG. 2) collects, retrieves, or otherwise receives data indicative of the performance of a computing system 102 (FIGS. 1 and 2) and any recent operational changes to the computing system 102. For example, intelligent agent 311 may collect data 302 regarding an operating system of computing system 102, data regarding one or more computing servers or other devices of system 102, data regarding clustering of computing system 102, data regarding a detected performance outage within computing system 102, or any other similar type of performance data.

More specifically, as shown in FIG. 3, intelligent agent 311 may collect operating system data 302, such as an operating system security patch, including an indication of whether the security patch was a critical or severe security patch. Similarly, intelligent agent 311 may collect operating system data 302 regarding a service pack (e.g., routine update), such as an indication of whether the service pack included relatively major or minor updates.

In some examples, intelligent agent 311 may collect data 304 regarding one or more servers or other computing devices of computing system 102. For example, intelligent agent 311 may determine whether computing system 102 includes local ("on-premise") servers and/or one or more remote or cloud-based servers, such as housed in a datacenter or managed by a separate commercial entity (e.g., Infrastructure-as-a-Service, or "IaaS"). Similarly, intelligent agent 311 may determine whether any applications running on servers of computing system 102 are locally installed or managed, or alternatively, are provided in the form of Software-as-a-Service ("SaaS") or Platform-as-a-Service ("PaaS").

In some examples, intelligent agent 311 may collect data 306 regarding the clustering of the servers (e.g., F5 clustering) or applications of computing system 102. In some examples, intelligent agent 311 may be configured to identify or detect an outage, such as an unavailability of one or more servers, data partitions, applications, or other system failure. In such cases, intelligent agent 311 may be configured to determine, such as by consulting a maintenance schedule 308, whether the detected outage was scheduled (e.g., a planned update), and if so, intelligent agent 311 may collect additional data such as a time of day of the planned outage, a type or identification of servers affected by the planned outage, and/or the effects of the outage, such as the particular updates to be performed. Conversely, intelligent agent may determine, based on maintenance schedules 308, that a detected outage was not scheduled, potentially indicative of a virus, bug, or other unanticipated system failure. In such cases, intelligent agent 311 may collect additional data such as a time of day of the detected outage, a type or identification of servers or applications affected by the outage, and/or the negative effects of the outage upon computing system 102.

In some examples, upon identifying a server or application exhibiting a reduced computing performance or other similar change, intelligent agent 311 (e.g., data collector 208) may conduct further investigation or diagnostic steps, such as by transmitting synthetic data transactions to the respective server or application to determine the response rate or the Raw Error Rate (RER). For example, a "synthetic transaction" to a server may include a "ping" to the server with a corresponding successful reply back. In other examples, a synthetic transaction to an application may include duplicating a previous data transaction that resulted in a failure (e.g., as indicated by user input or feedback).

Based on the collected data, intelligent agent 311 may execute a relative performance score calculation, as described with respect to FIG. 2, above. If the performance score indicates that an under-performing application is sufficiently stable (e.g., exceeds the threshold performance score), intelligent agent 311 may take no further action. If however, the relative performance score indicates a failing (e.g., below-threshold) score, intelligent agent 311 may automatically review collected data from informational logs and compare timestamps to ensure accuracy of the affected item (e.g., application or server). Intelligent agent 311 may then perform any of a number of remedial actions. In some examples, intelligent agent 311 may attempt self-recovery, such as rolling back an operating system update to a previous version. In some examples, intelligent agent 311 may remove an under-performing server from the server pool (e.g., in response to a sufficiently low technology sub-score). In some examples, intelligent agent 311 may uninstall offending application(s) to put a server back into a last-known "good" state. In some examples, intelligent agent 311 may throttle a volume of data transactions sent to a server or application, such as by 25% per server type.

After the attempted remedial actions, intelligent agent 311 may re-calculate the performance score. If a passing (e.g., above-threshold) score is achieved, intelligent agent 311 may notify IT personnel of the successful operation. If a failing (e.g., below-threshold) score is still obtained, intelligent agent 311 may request further support from IT personnel.

Figure 4:
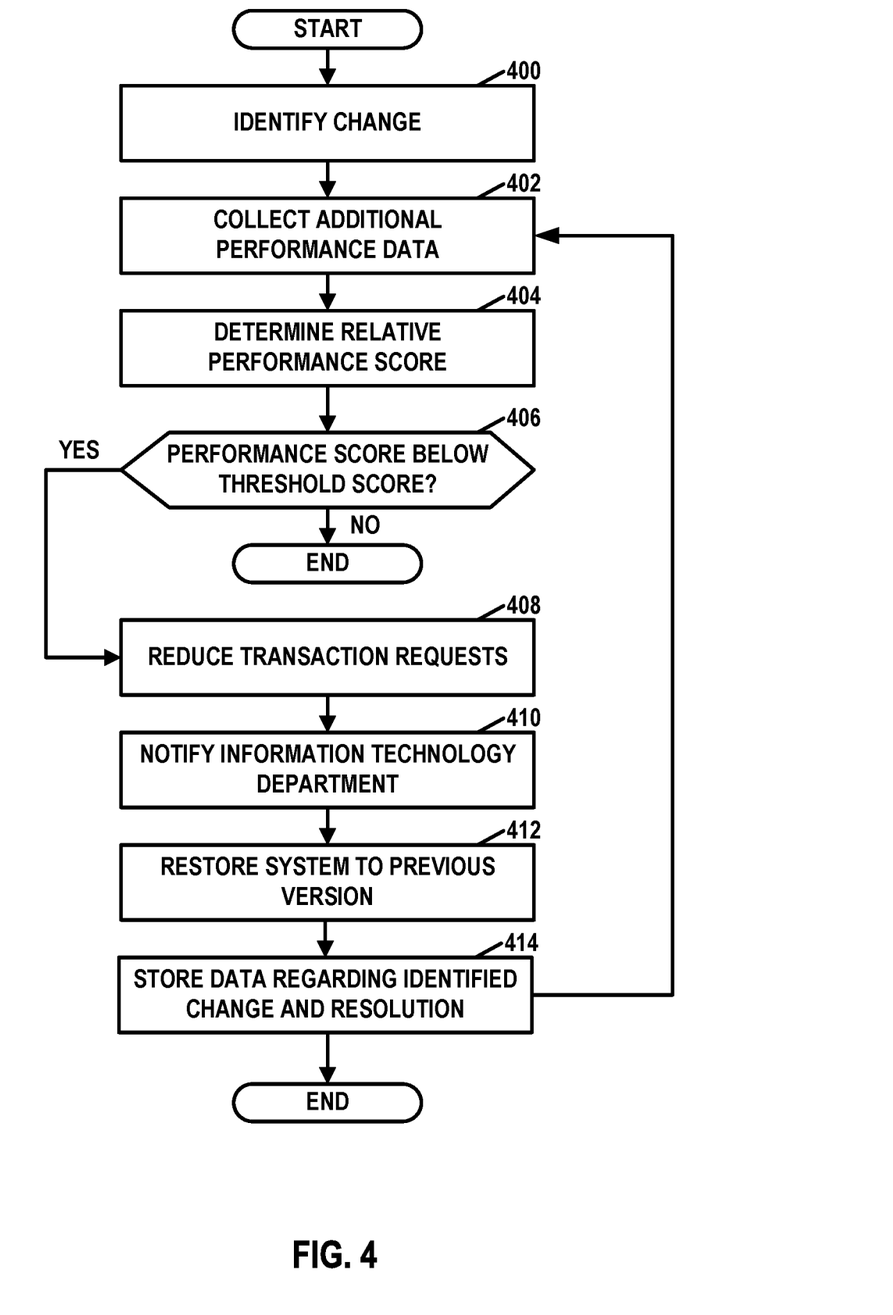
FIG. 4 is a flowchart illustrating an example operation in accordance with one or more aspects of this disclosure.

FIG. 4 is a flowchart illustrating a first example operation in accordance with one or more aspects of this disclosure. The operation shown in FIG. 4 of this disclosure is provided as an example. In other examples, operations may include more, fewer, or different actions, and/or actions may be performed in different orders. FIG. 4 is explained with reference to FIG. 1 and FIG. 2. However, in other examples, the actions described in FIG. 4 may be performed in other contexts and by other components.

A performance monitoring system 111 of a computing system 102 identifies a change to the computing system 102 (400). For example, performance monitoring system 111 may monitor for updates to an operating system or application, or the installation of a new application, or a change in performance of the computing system, such as a reduction in transaction rates, an outage of one or more servers, an unexpected closure of an application, a sudden increase in CPU usage, or other similar changes.

Upon detecting one of these types of changes to computing system 102, performance monitoring system 111 collect additional performance data (402). For example, performance monitoring system 111 may run one or more diagnostic tests, collect a system error log or system event viewer, and/or generate one or more synthetic data transactions to test the response time of a server or application of system 102.

Based on the collected additional performance data, performance monitoring system 111 may generate a relative performance score indicating the relative severity of any detected changes or malfunctions to computing system 102 (404). In particular, the relative performance score may include a "usability" sub-score indicating at least the direct effects of the changes on user operations conducted via computing system 102, or the ability of a user to meet contractual obligations (e.g., complete projects by a deadline) via computing system 102 in its present reduced-functionality condition. A relatively low "usability" sub-score may indicate that immediate remedial action is warranted, even if the remedial action temporarily reduces the performance of computing system 102 even further, since the performance of computing system 102 is substantially impaired anyway. Conversely, a relatively high "usability" sub-score may indicate that, for example, only back-end data processing of system 102 has been affected, which may be resolved at a later time, such as during a time of typically reduced system usage (e.g., overnight) or during a future scheduled outage or update.

Accordingly, performance monitoring system 111 may determine whether the relative performance score, or any of the composing sub-scores, is below a corresponding pre-determined threshold score (406). In such cases ("YES" branch of 406), performance monitoring system may implement one or more of a series of immediate remedial actions, such as reducing or throttling data requests or transactions to an identified malfunctioning server or application (408), notifying an information technology (IT) department of any identified system errors (410), or automatically attempting a system restore (412), such as rolling back an update to a previous version.

In some examples, performance monitoring system 111 may store in memory data indicating or describing any diagnosed performance issues as well as their causes, attempted solutions, and whether the attempted solutions were successful (414). Accordingly, prior to any subsequent scheduled changes (e.g., updates) or after identifying a subsequent performance issue, performance monitoring system 111 may consult the data stored in memory to determine (1) if a similar planned update is likely to result in similar performance issues, or (2) if performance monitoring system 111 has previously recovered from a similar performance issue and what the solution was.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

The following paragraphs provide a non-limiting list of examples in accordance with techniques of this disclosure.

Example 1: In some examples, a method includes identifying, by a first computing system, a change to a second computing system comprising at least one server running two or more applications; running, by the first computing system, one or more diagnostic tests on each of the two or more applications to collect additional performance data; determining, by the first computing system based on the additional performance data, a relative performance score for each of the two or more applications, wherein the relative performance score for a respective application indicates at least an effect of the change on an ability of a user to use the respective application to perform one or more user operations; determining, by the first computing system, that the performance score is less than a threshold score; and automatically reducing, by the first computing system, a rate of transaction requests sent to the server in response to determining that the performance score is less than the threshold score.

Example 2: In some examples of the method of Example 1, identifying the change to the second computing system includes identifying, by the first computing system, an update to the second computing system; comparing, by the first computing system, a performance of the second computing system prior to the update to the performance of the second computing system after the update; and determining, by the first computing system, that the performance of the second computing system after the update is lower than the performance of the second computing system prior to the update, wherein the previous version of the second computing system comprises a most-recent version of the second computing system prior to the update.

Example 3: In some example of the method of Example 1 or Example 2, the relative performance score comprises a sum of a plurality of sub-scores, wherein the plurality of sub-scores includes (1) a usability score indicating the effect of the change on the ability of the user to use the respective application to perform the one or more user operations; (2) a technology score indicating a relative status of one or more technological aspects of the computing system; and (3) an operational impact score indicating an overall relative operability of the second computing system or an application of the second computing system.

Example 4: In some examples of the method of Example 3, the technology score is based on a number of inactive servers; a number of inactive applications; a response time of an application relative to a threshold range; or whether an outage of the second computing system is scheduled or unscheduled.

Example 5: In some examples of the method of Example 3, the usability score is based on: a first relative severity of the effect of the change on front-end operations of the second computing system; a second relative severity of the effect of the change on back-end operations of the second computing system; a third relative severity of the effect of the change on the ability of the second computing system to complete contractual obligations by respective deadlines; or a relative recovery opportunity indicative of an amount of time available to improve a performance of the second computing system before the one or more user operations are substantially affected.

Example 6: In some example of the method of Example 3, the method further includes outputting for display, by the first computing system, the relative performance score and the sub-scores.

Example 7: In some examples of the method of any of Examples 1-6, the method further includes automatically restoring the second computing system to a previous version of the second computing system in response to determining that the performance score is less than the threshold score.

Example 8: In some examples of the method of any of Examples 1-7, the method further includes automatically outputting an alert in response to determining that the performance score is less than the threshold score.

Example 9: In some examples of the method of any of Examples 1-8, the method further includes storing, by the first computing system, data comprising the additional performance data and the relative performance score; retrieving, by the first computing system, the stored data prior to a subsequent update of the second computing system; and determining, by the first computing system based on the stored data, that the subsequent update will not result in a subsequent diminished performance of the second computing system.

Example 10: In some examples of the method of any of Examples 1-9, the additional performance data includes a system error log or a system event log.

Example 11: In some examples of the method of Example 10, the method further includes determining, by the first computing system based on the additional performance data, a specific system change responsible for the performance score by filtering out, from the additional performance data, error-free downloads and installations, and by filtering out warning messages on logs.

Example 12: In some examples of the method of Example 11, the method further includes automatically attempting, based on the specific system change, a system recovery of the second computing system; and determining, by the first computing system, whether the system recovery results in an increased performance score.

Example 13: In some examples of the method of any of Examples 1-12, running the one or more diagnostic tests on the second computing system to collect the additional performance data includes transmitting, by the first computing system, a synthetic transaction to the server or to the application to determine a response time of the server or the application.

Example 14: In some examples, a first computing system includes a memory configured to store performance data; and one or more processors configured to identify a change to a second computing system; run one or more diagnostic tests on the second computing system to collect the performance data; determine, based on the additional performance data, a relative performance score for the second computing system, wherein the relative performance score indicates at least an effect of the change on one or more user operations of the second computing system; determine that the performance score is less than a threshold score; and automatically reduce a rate of transaction requests sent to a server or an application of the second computing system in response to determining that the performance score is less than the threshold score.

Example 15: In some examples of the first computing system of Example 14, the one or more processors are configured to identify the change to the second computing system by identifying an update to the second computing system; comparing a performance of a previous version of the second computing system prior to the update to the performance of the second computing system after the update; and determining that the performance of the second computing system after the update is lower than the performance of the second computing system prior to the update, wherein the previous version of the second computing system comprises a most-recent version of the second computing system prior to the update.

Example 16: In some examples of the first computing system of Example 14 or Example 15, the relative performance score includes a sum of a plurality of sub-scores, wherein the plurality of sub-scores includes: (1) a usability score indicating the effect of the change on the one or more user operations; (2) a technology score indicating a relative status of one or more technological aspects of the second computing system; and (3) an operational impact score indicating an overall relative operability of the computing system or an application of the second computing system.

Example 17: In some examples of the first computing system of Example 16, the technology score is based on: a number of inactive servers of the second computing system; a number of inactive applications of the second computing system; a response time of an application relative to a threshold range; or whether an outage of the second computing system is scheduled or unscheduled.

Example 18: In some examples of the first computing system of Example 16, the usability score is based on: a relative severity of the effect of the change on front-end operations of the second computing system; a relative severity of the effect of the change on back-end operations of the second computing system; a relative severity of the effect of the change on the ability of the second computing system to complete contractual obligations by respective deadlines; or a relative recovery opportunity indicative of an amount of time available to improve a performance of the second computing system before the one or more user operations are substantially affected.

Example 19: In some examples of the first computing system of Example 16, the one or more processors are further configured to output for display the relative performance score and the sub-scores.

Example 20: In some example of the first computing system of any of Examples 14-19, the one or more processors are further configured to: retrieve, from the memory, a previous version of the second computing system; and automatically restore the second computing system to the previous version of the second computing system in response to determining that the performance score is less than the threshold score.

Example 21: In some examples of the first computing system of any of Examples 14-20, the one or more processors are further configured to: store, in the memory, data comprising the additional performance data and the relative performance score; retrieve, from the memory, the stored data prior to a subsequent update to the second computing system; and determine, based on the stored data, that the subsequent update will not result in a subsequent diminished performance of the second computing system.

Example 22: In some examples of the first computing system of any of Examples 14-21, the one or more processors are configured to run the one or more diagnostic tests to collect the additional performance data by transmitting a synthetic transaction to the server or to the application to determine a response time of the server or the application.

Example 23: In some examples, a non-transitory computer-readable storage medium includes instructions stored thereon that, when executed, configure a first computing system to: identify a change to a second computing system; run one or more diagnostic tests on the second computing system to collect additional performance data; determine, based on the additional performance data, a relative performance score for the second computing system, wherein the relative performance score indicatives at least an effect of the change on one or more user operations; determine that the performance score is less than a threshold score; and automatically reduce a rate of transaction requests sent to a server or application of the second computing system in response to determining that the performance score is less than the threshold score.

Example 24: In some examples, a first computing system includes: means for identifying a change to a second computing system; means for running one or more diagnostic tests on the second computing system to collect additional performance data; means for determining, based on the additional performance data, a relative performance score for the second computing system, wherein the relative performance score indicates at least an effect of the change on one or more user operations; means for determining that the performance score is less than a threshold score; and means for automatically reducing a rate of transaction requests sent to a server or application of the second computing system in response to determining that the performance score is less than the threshold score.

Example 25: In some examples of the first computing system of Example 24, the first computing system includes the second computing system.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   identifying, by a first computing system, a change to a second computing system comprising at least one server running two or more applications;
   running, by the first computing system, one or more diagnostic tests on each of the two or more applications to collect performance data; and
   determining, by the first computing system based on the performance data, a relative performance score for each of the two or more applications, wherein, for each respective application of the two or more applications the relative performance score for the respective application indicates at least an effect of the change to the second computing system on an ability of a user to use the respective application to perform one or more user operations, and
   determining, by the first computing system, that the relative performance score for a specific application of the two or more applications is less than a threshold score; and
   automatically reducing, by the first computing system, a rate of transaction requests sent to the at least one server in response to determining that the relative performance score for the specific application is less than the threshold score.

2. The method of claim 1, wherein identifying the change to the second computing system comprises:
   identifying, by the first computing system, an update to the second computing system;
   comparing, by the first computing system, a first performance of a previous version of the second computing system prior to the update to a second performance of a subsequent version of the second computing system after the update; and
   determining, by the first computing system, that the second performance of the subsequent version of the second computing system after the update is lower than the first performance of the previous version of the second computing system prior to the update, wherein the previous version of the second computing system comprises a most-recent version of the second computing system prior to the update.

3. The method of claim 1, wherein, for each respective application of the two or more applications, the relative performance score for the respective application comprises a sum of a plurality of sub-scores, wherein the plurality of sub-scores comprises:
- a usability score indicating the effect of the change to the second computing system on the ability of the user to use the respective application to perform the one or more user operations;
- a technology score indicating a relative status of one or more technological aspects of the second computing system; and
- an operational impact score indicating an overall relative operability of the second computing system or the respective application of the second computing system.

4. The method of claim 3, wherein the technology score is based on:
- a number of inactive servers of the one or more servers of the second computing system;
- a number of inactive applications of the two or more applications;
- a response time of the respective application relative to a threshold range; or
- whether an outage of the second computing system is scheduled or unscheduled.

5. The method of claim 3, wherein the usability score is based on:
- a first relative severity of the effect of the change to the second computing system on front-end operations of the second computing system;
- a second relative severity of the effect of the change to the second computing system on back-end operations of the second computing system;
- a third relative severity of the effect of the change to the second computing system on the ability of the second computing system to complete contractual obligations by respective deadlines; or
- a relative recovery opportunity indicative of an amount of time available to improve a performance of the second computing system before the one or more user operations are substantially affected.

6. The method of claim 3, further comprising outputting for display, by the first computing system, the relative performance score and the sub-scores for each of the two or more applications.

7. The method of claim 1, further comprising automatically restoring the second computing system to a previous version of the second computing system in response to determining that the relative performance score for the specific application is less than the threshold score.

8. The method of claim 1, further comprising automatically outputting an alert in response to determining that the relative performance score for the specific application is less than the threshold score.

9. The method of claim 1, further comprising:
- storing in memory, by the first computing system, data comprising the performance data and the relative performance score for each of the two or more applications;
- retrieving, by the first computing system, the data from the memory prior to a subsequent update of the second computing system; and
- determining, by the first computing system based on the data, that the subsequent update will not result in a diminished performance of the second computing system.

10. The method of claim 1, wherein the performance data comprises a system error log or a system event log of the second computing system.

11. The method of claim 10, further comprising, for each respective application of the two or more applications, determining, by the first computing system based on the performance data, a specific system change responsible for the relative performance score for the respective application by filtering out, from the performance data, error-free downloads, error-free installations, and warning messages on logs of the system error log or the system event log.

12. The method of claim 11, further comprising:
- automatically attempting, based on the specific system change, a system recovery of the second computing system; and
- determining, by the first computing system, whether the system recovery results in an increased relative performance score for the respective application.

13. The method of claim 1, wherein running the one or more diagnostic tests comprises transmitting, by the first computing system, a synthetic transaction to the at least one server or to the two or more applications to determine a response time of the server of the one or more servers or the two or more applications.

14. A first computing system comprising:
- a memory configured to store performance data; and
- one or more processors configured to:
  - identify a change to a second computing system;
  - run one or more diagnostic tests on the second computing system to collect the performance data;
  - determine, based on the performance data, a relative performance score for the second computing system, wherein the relative performance score indicates at least an effect of the change to the second computing system on one or more user operations of the second computing system;
  - determine that the relative performance score is less than a threshold score; and
  - automatically reduce a rate of transaction requests sent to a server of the second computing system or an application of the second computing system in response to determining that the relative performance score is less than the threshold score.

15. The first computing system of claim 14, wherein the one or more processors are configured to identify the change to the second computing system by:
- identifying an update to the second computing system;
- comparing a first performance of a previous version of the second computing system prior to the update to a second performance of a subsequent version of the second computing system after the update; and
- determining that the second performance of the subsequent version of the second computing system after the update is lower than the first performance of the previous version of the second computing system prior to the update, wherein the previous version of the second computing system comprises a most-recent version of the second computing system prior to the update.

16. The first computing system of claim 14, wherein the relative performance score comprises a sum of a plurality of sub-scores for the second computing system, wherein the plurality of sub-scores comprises:

a usability score indicating the effect of the change to the second computing system on the one or more user operations;

a technology score indicating a relative status of one or more technological aspects of the second computing system; and an operational impact score indicating an overall relative operability of the second computing system or the application of the second computing system.

17. The first computing system of claim 16, wherein the technology score is based on:

a number of inactive servers of the second computing system;

a number of inactive applications of the second computing system;

a response time of the application relative to a threshold range; or whether an outage of the second computing system is scheduled or unscheduled.

18. The first computing system of claim 16, wherein the usability score is based on:

a relative severity of the effect of the change to the second computing system on front- end operations of the second computing system;

a relative severity of the effect of the change to the second computing system on back- end operations of the second computing system;

a relative severity of the effect of the change to the second computing system on an ability of the second computing system to complete contractual obligations by respective deadlines; or a relative recovery opportunity indicative of an amount of time available to improve a performance of the second computing system before the one or more user operations are substantially affected.

19. The first computing system of claim 16, wherein the one or more processors are further configured to output for display the relative performance score and the plurality of sub-scores.

20. The first computing system of claim 14, wherein the one or more processors are further configured to:

retrieve, from the memory, a previous version of the second computing system; and automatically restore the second computing system to the previous version of the second computing system in response to determining that the relative performance score is less than the threshold score.

21. The first computing system of claim 14, wherein the one or more processors are further configured to:

store, in the memory, data comprising the performance data and the relative performance score;

retrieve, from the memory, the data prior to an update to the second computing system; and determine, based on the data, that the update will not result in a diminished performance of the second computing system.

22. The first computing system of claim 14, wherein the one or more processors are configured to run the one or more diagnostic tests to collect the performance data by transmitting a synthetic transaction to the server or to the application of the second computing system to determine a response time of the server or the application.

23. A non-transitory computer-readable storage medium having instructions stored thereon that, when executed, configure a first computing system to:

identify a change to a second computing system;

run one or more diagnostic tests on the second computing system to collect performance data;

determine, based on the performance data, a relative performance score for the second computing system, wherein the relative performance score indicatives at least an effect of the change to the second computing system on one or more user operations;

determine that the relative performance score is less than a threshold score; and automatically reduce a rate of transaction requests sent to a server of the second computing system or an application of the second computing system in response to determining that the relative performance score is less than the threshold score.

24. The first computing system of claim 23, wherein the first computing system comprises the second computing system.

* * * * *